US010336903B2

(12) United States Patent
Jung

(10) Patent No.: US 10,336,903 B2
(45) Date of Patent: Jul. 2, 2019

(54) POLYAMIDE BASED COMPOSITION CONTAINING POLYKETONE AND RUBBER

(71) Applicant: RHODIA OPERATIONS, Aubervilliers (FR)

(72) Inventor: Jin-Kyung Jung, Seoul (KR)

(73) Assignee: RHODIA OPERATIONS, Aubervilliers (FR)

( * ) Notice: Subject to any disclaimer, the term of this patent is extended or adjusted under 35 U.S.C. 154(b) by 393 days.

(21) Appl. No.: 15/021,303

(22) PCT Filed: Sep. 12, 2014

(86) PCT No.: PCT/EP2014/069553
§ 371 (c)(1),
(2) Date: Mar. 11, 2016

(87) PCT Pub. No.: WO2015/039975
PCT Pub. Date: Mar. 26, 2015

(65) Prior Publication Data
US 2016/0222209 A1    Aug. 4, 2016

(30) Foreign Application Priority Data

Sep. 17, 2013 (EP) .................................... 13184671

(51) Int. Cl.
| B29C 45/00 | (2006.01) |
| B29K 19/00 | (2006.01) |
| B29K 61/00 | (2006.01) |
| B29K 77/00 | (2006.01) |
| C08L 23/08 | (2006.01) |
| C08L 23/16 | (2006.01) |
| C08L 51/04 | (2006.01) |
| C08L 73/00 | (2006.01) |
| C08L 77/00 | (2006.01) |
| C08L 77/02 | (2006.01) |
| C08L 77/06 | (2006.01) |

(52) U.S. Cl.
CPC .......... *C08L 77/06* (2013.01); *B29C 45/0001* (2013.01); *C08L 77/00* (2013.01); *C08L 77/02* (2013.01); *B29K 2019/00* (2013.01); *B29K 2061/00* (2013.01); *B29K 2077/00* (2013.01); *B29K 2995/0037* (2013.01); *C08L 23/0869* (2013.01); *C08L 23/16* (2013.01); *C08L 51/04* (2013.01); *C08L 73/00* (2013.01)

(58) Field of Classification Search
None
See application file for complete search history.

(56) References Cited

U.S. PATENT DOCUMENTS

| 3,564,077 A | 2/1971 | Brinkmann et al. |
| 3,694,412 A | 9/1972 | Nozaki |
| 3,919,353 A | 11/1975 | Castelnuovo et al. |
| 4,292,233 A | 9/1981 | Binsack et al. |
| 4,417,026 A | 11/1983 | Lindner et al. |
| 4,843,144 A | 6/1989 | Van Broekhoven et al. |
| 4,880,903 A | 11/1989 | Van Broekhoven et al. |
| 5,030,689 A | 7/1991 | Plachetta et al. |
| H988 H | 11/1991 | Gergen et al. |
| H1021 H | 2/1992 | Machado et al. |
| 5,175,210 A * | 12/1992 | Machado ............... C08L 73/00 525/185 |
| 5,419,049 A | 5/1995 | MacArthur-Onslow |
| 5,486,594 A | 1/1996 | Gingrich et al. |
| 5,959,069 A | 9/1999 | Glueck et al. |
| 6,060,580 A | 5/2000 | Nijenhuis et al. |
| 6,150,474 A | 11/2000 | Stoeppelmann et al. |
| 6,160,080 A | 12/2000 | Cucinella et al. |
| 6,525,166 B1 | 2/2003 | Di Silvestro et al. |
| 6,872,800 B1 | 3/2005 | Bouquerel et al. |
| 6,867,256 B1 | 5/2005 | Di Silvestro et al. |
| 2012/0271001 A1 | 10/2012 | Lee et al. |
| 2013/0144001 A1 | 6/2013 | Vergelati et al. |

FOREIGN PATENT DOCUMENTS

| DE | 1694173 A1 | 6/1971 |
| DE | 2348377 A1 | 4/1975 |
| EP | 022216 A1 | 1/1981 |
| EP | 050262 A1 | 4/1982 |
| EP | 0632703 A1 | 1/1995 |
| EP | 0682057 A1 | 11/1995 |
| EP | 0832149 A1 | 4/1998 |
| KR | 20120077366 A | 7/2012 |
| WO | 9724388 A1 | 7/1997 |
| WO | 9903909 A1 | 1/1999 |
| WO | 9964496 A1 | 12/1999 |
| WO | 0068298 A1 | 11/2000 |
| WO | 20110128358 A1 | 10/2011 |

* cited by examiner

Primary Examiner — Ana L. Woodward
(74) Attorney, Agent, or Firm — Osha Liang LLP

(57) ABSTRACT

The present invention relates to a polyannide composition comprising polyamide, polyketone, and rubber, wherein the polyketone is present in an amount of no more than 5 wt %, based on the total weight of the polyamide composition. The inventive polyamide composition has and exhibits improved mechanical properties and chemical resistance both to Zinc salt and glycol, and thus is particularly useful in the manufacture of articles for automotive application.

15 Claims, No Drawings

POLYAMIDE BASED COMPOSITION CONTAINING POLYKETONE AND RUBBER

CROSS-REFERENCE TO RELATED APPLICATION

The present application is a U.S. national stage entry under 35 U.S.C. § 371 of International Application No. PCT/EP2014/069553, filed Sep. 12, 2014, which claims priority to European application No. 13184671.9 filed on Sep. 17, 2013, the whole content of these applications being hereby incorporated herein by reference. Should the disclosure of any patents, patent applications, and publications which are incorporated herein by reference conflict with the description of the present application to the extent that it may render a term unclear, the present description shall take precedence.

TECHNICAL FIELD

The present invention mainly pertains to a polyamide based composition with improved chemical resistance and mechanical properties. The composition further comprises at least one polyketone component and rubber additive, and is particularly advantageous in the use of manufacturing automotive articles.

BACKGROUND ART

Polyamides are synthetic polymers which are widely used in many industrial applications. Particularly, a well-known use of polyamides resides in the field of manufacturing automotive parts, which have high requirements for stiffness, mechanical strength, dimensional stability, and physical/chemical resistance to the environment they are exposed to. In order to meet these requirements, it is usually desired that the polyamides be modified: either by the addition of different additives or by blending them with another polymeric material.

For instance, U.S. Pat. No. 5,486,594 (SHELL OIL COMPANY) Jun. 11, 1994 describes a modified polyamide composition comprising 80 to 85 weight percent of a polyamide selected from Nylon 6, Nylon 11 and Nylon 12 and from 15 to 20 weight percent of a polyketone as a Nylon toughener. Noticeably, as observed in the Examples of U.S. Pat. No. 5,486,594, the amount of polyketone additive in the modified polyamide composition is required to reach at least 15 weight percent, otherwise the desired impact toughening effect would not be happening.

Nevertheless, blending a significant amount of polyketone into a polyamide composition is known to be difficult, as there is the risk of crosslinking or decomposition. Moreover, due to the curing properties of polyketones (by heating or by light irradiation), excessive use of this polymer in automotive parts would raise their recycling difficulty.

Aiming to solve this blending problem, U.S. Pat. No. 6,150,474 (EMS-INVENTA AG) Dec. 22, 1998 provides a polyamide-polyketone blend composition in which the polyamide is prepared to have a clear surplus of COOH groups. More specifically, as revealed from the Examples of U.S. Pat. No. 6,150,474, a stable polyamide-polyketone blend was only achieved for polyamides in which the $NH_2$ end-group concentration is less than 15 µeq/g and the carboxyl end-group concentration is at least 80 µeq/g. In comparison, blend samples not meeting these end-group concentration criteria showed no extrudability due to decomposition reactions.

Apart from the abovementioned compounding/extruding difficulties, a polyamide based composition blended with a minor amount of polyketone is also found to be susceptible to salt stress induced corrosion cracking, a property that makes it a less-desirable material for vehicle components. This is because, in colder climate, the vehicle components are sometimes exposed to salts such as sodium chloride or calcium chloride which are used to melt snow and ice.

Furthermore, a polyamide based composition blended with a minor amount of polyketone also fails to provide reliable glycol resistance, which is a crucial property for vehicle parts which are exposed to anti-freezing agents.

Therefore, the need was felt to have new, improved polyamide-polyketone blends, which circumvent the prior art limitations by providing good extrudability and excellent chemical resistance in a composition that is easy to compound and recycle.

The Applicant has now found that by combining a rubber component and a minor amount of polyketone in a polyamide based composition, the above technical object can be achieved.

SUMMARY OF INVENTION

The present invention thus pertains to a polyamide composition [composition (C)] comprising:
at least one polyamide [polyamide (A)];
at least one polyketone [polyketone (K)], in an amount of no more than 5 wt %, based on the total weight of the composition (C); and
at least one rubber [rubber (R)].

The Applicant has surprisingly discovered that the combined addition of a rubber component and a minor amount of polyketone to the above polyamide composition advantageously provides a polymer blend that is easy to mix and extrude. Moreover, articles produced from such polymer blend exhibited well-balanced stiffness, mechanical strength and dimensional stability, and showed excellent chemical resistance both to glycol and salt cracking.

Furthermore, the Applicant has also found that, by incorporating a rubber component in the polyamide/polyketone mixture, it is possible to reduce or even eliminate the heavy use of toxic plasticizers (e.g. N-butylbenzenesulphonamide, or "BBSA") which are otherwise necessary for extrusion purpose or for properties modifications to suit automotive use.

The Polyamide (A)

For the purpose of the invention, the term "polyamide" is intended to denote any polymer having recurring amide groups (—NH—CO—) as an integral part of the polymer chain.

Specifically, the polyamide (A) is a condensation product of at least one mixture selected from:
mixtures (M1) comprising at least a diacid [acid (DA)] (or derivative thereof) and at least a diamine [amine (NN)] (or derivatives thereof);
mixtures (M2) comprising at least a lactam [lactam (L)];
mixtures (M3) comprising at least an aminocarboxylic acid [aminoacid (AN)]; and
combinations thereof.

Acid (DA) derivatives include notably salts, anhydride, esters and acid halides, able to form amide groups; similarly, amine (NN) derivatives include notably salts thereof, equally able to form amide groups.

Said acid (DA) can be an aromatic dicarboxylic acid comprising two reactive carboxylic acid groups [acid (AR)] or an aliphatic dicarboxylic acid comprising two reactive carboxylic acid groups [acid (AL)]. For the purpose of the present invention, a dicarboxylic acid is considered as "aromatic" when it comprises one or more than one aromatic group.

Non limitative examples of acids (AR) are notably phthalic acids, including isophthalic acid (IA), and terephthalic acid (TA), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid.

Among acids (AL), mention can be notably made of oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{11}$—COOH], octadecandioic acid [HOOC—$(CH_2)_{16}$—COOH].

Preferably, the acid (DA) used for the manufacture of the polyamide (A) will be an acid (AL), as above detailed, possibly in combination with a minor amount of an acid (AR), as above detailed. Preferred examples of acid (AL) include adipic acid, sebacic acid, and dodecanedioic acid.

The amine (NN) is generally selected from the group consisting of aliphatic alkylene diamines, aromatic diamines and mixtures thereof.

Said aliphatic alkylene diamines are typically aliphatic alkylene diamines having 2 to 18 carbon atoms.

Said aliphatic alkylene diamine is advantageously selected from the group consisting of 1,2-diaminoethane, 1,2-diaminopropane, propylene-1,3-diamine, 1,3-diaminobutane, 1,4-diaminobutane, 1,5-diaminopentane, 1,5-diamino-2-methylpentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1.8-diamino-2,4-dimethyloctane, 1,8-diamino-3,4-dimethyloctane, 1,8-diamino-4,5-dimethyloctane, 1.8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane, 1,13-diaminotridecane.

The aliphatic alkylene diamine preferably comprises at least one diamine selected from the group consisting of 1,6-diaminohexane, 1,8-diamino-octane, 1,10-diaminodecane, 1,12-diaminododecane and mixtures thereof. More preferably, the aliphatic alkylene diamine comprises at least one diamine selected from the group consisting of 1,6-diaminohexane, 1,10-diaminodecane and mixtures thereof.

The aromatic diamine is preferably selected from the group consisting of meta-phenylene diamine, meta-xylylene diamine and para-xylylene diamine.

Preferably, the amine (NN) used for the manufacture of the polyamide (A) will be an aliphatic alkylene diamine, as above detailed, possibly in combination with a minor amount of an aromatic diamine, as above detailed.

Preferred mixtures (M1) are selected from:
mixtures of adipic acid and 1,6-diaminohexane;
mixtures of adipic acid, terephthalic acid and 1,6-diaminohexane;
mixtures of sebacic acid and 1,6-diaminohexane;
mixtures of sebacic acid and 1,10-diaminodecane;
mixtures of dodecandioic acid and 1,10-diaminodecane; and
mixtures of dodecandioic acid and 1,12-diaminododecane.

Lactam (L) suitable for use for the manufacture of polyamide (A) can be any of β-lactam or ε-caprolactam.

Preferred mixture (M2) comprises ε-caprolactam.

Aminoacid (AN) suitable for use for the manufacture of polyamide (A) can be selected from the group consisting of 6-amino-hexanoic acid, 9-aminononanoic acid, 10-aminodecanoic acid, 11-aminoundecanoic acid, 12-aminododecanoic acid.

It is still within the scope of the invention the addition to any of mixtures (M1), (M2), (M3), and their combinations, of one or more than one polyfunctional acid/amine monomers comprising more that two carboxylic acid and amine groups, e.g. polycarboxylic acid having three or more carboxylic acid groups, polyamines having three or more amine groups, polyfunctional diacid including two carboxylic groups and one or more amine groups, polyfunctional diamine including two amine groups and one or more carboxylic acid groups. Incorporation of said polyfunctional acid/amine monomers generally lead to branched structures, star-like or tree-like, such as those notably described in WO 97/24388 (NYLTECH ITALIA [IT]) Jul. 10, 1997 and in WO 99/64496 (NYLTECH ITALIA [IT]) Dec. 16, 1999.

It is also further understood that one or more than one end capping agent [agent (M)] can be added to any of mixtures (M1), (M2), (M3), and their combinations for the manufacture of polyamide (A), without this departing from the scope of the invention. The agent (M) is generally selected from the group consisting of an acid comprising only one reactive carboxylic acid group [acid (MA)] and an amine comprising only one reactive amine group [agent (MN)].

Acid (MA) is preferably selected from the group consisting of acetic acid, propionic acid, butyric acid, valeric acid, caproic acid, caprylic acid, lauric acid, stearic acid, cyclohexanecarboxylic acid, benzoic acid, preferably from acetic acid and benzoic acid.

Amine (MN) is preferably selected from the group consisting of methylamine, ethylamine, butylamine, hexylamine, octylamine, benzylamine, aniline, toluidine.

Preferred examples of polyamide (A) can be selected from the group consisting of: poly(ε-caprolactam) (PA 6), poly(tetramethylene adipamide) (PA 46), poly(hexamethylene adipamide) (PA 66), poly(hexamethylene decanediamide) (PA 610), poly(decamethylene decanediamide) (PA1010), poly(decamethylene dodecanediamide) (PA1012), and poly(dodecamethylene dodecanediamide) (PA1212).

More preferably, the composition (C) contains a blend of at least two polyamides (A) selected from the above-described group, for example but unlimited to a blend of PA 610 and PA 1010.

According to a preferred embodiment of the present invention, the polyamide (A) has a relative viscosity of around 3, which is especially suitable for extrusion application. Nevertheless, it is also possible to use polyamides with lower or higher relative viscosities in the composition (C).

As used herein, the "relative viscosity" refers to the ratio of solution and solvent viscosities measured in a capillary viscometer at 25° C. The solvent is 96% sulfuric acid, and the solution is 1.0% by weight polyamide polymer dissolved in said solvent.

The polyamide (A) can in particular be a polymer comprising star or H macromolecular chains, a branched or hyperbranched polymer, and, if appropriate, a polymer comprising linear macromolecular chains. Polymers comprising such star or H macromolecular chains are, for example, described in the documents of FR 2743077, FR 2779730, U.S. Pat. No. 5,959,069, EP 0632703, EP 0682057 and EP 0832149.

The polyamide (A) can be a polymer of random tree type, preferably a copolyamide exhibiting a random tree structure. These copolyamides with a random tree structure and their process of preparation are described in particular in the document of WO 99/03909. The polyamide (A) can also be a hyperbranched copolyamide of the type of those described in the document of WO 00/68298. The composition of the invention can also comprise any combination of linear, star, H and tree thermoplastic polymer and hyperbranched copolyamide as described above.

The polyamide (A) can exhibit a number of terminal acid groups of between 30 and 100 meq/kg. The polyamide (A) can exhibit a number of terminal amine groups of between 30 and 100 meq/kg.

The composition (C) according to the invention generally contains from 30% to 90% by weight of polyamide (A), preferably from 50% to 90% by weight, and more preferably from 70% to 85% by weight, with respect to the total weight of the composition.

The Polyketone (K)

The polyketone (K) used according to the present invention can be aliphatic and/or aromatic, preferably aliphatic.

The polyketone (K) comprises repeating units of Formula (a) below:

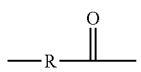

(a)

wherein R represents a hydrocarbon group. When the polyketone (K) is an aromatic polyketone, R is independently at each occurrence a substituted or unsubstituted, monocyclic or polycyclic aromatic group having 6 to 30 carbons, and the exemplary aromatic groups include phenyl, tolyl, napthyl, and biphenyl.

Typically, the polyketone (K) is an aliphatic polyketone, in which case R is independently at each occurrence an optionally substituted, ethylenically unsaturated hydrocarbon group having 2 to 12 carbon atoms. Preferably, the aliphatic polyketone (K) is selected from copolymers of ethylene and carbon oxide or copolymers of ethylene, propylene and carbon oxide.

A preferred class of polyketone (K) comprises repeating units of formula (b) below:

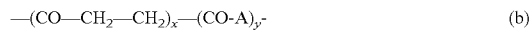

(b)

in which A denotes an ethylenically unsaturated hydrocarbon group having at least 3 carbon atoms, such as, propylene —$CH_2$—$CH(CH_3)$—, phenylene —$C_6H_4$— or aryl ether —$C_6H_4$—O—$C_6H_4$— radicals. The x/y ratio can be at least 2. Said repeating units can be distributed at random in the main chain of the polyketone (K).

The number-average molar masses of the polyketone (K) can be between 1000 and 200,000 g/mol, advantageously between 20,000 and 90,000 g/mol, measured by gel permeation chromatography. The melting point of polyketone (K) can be between 175° C. and 300° C., generally between 200° C. and 270° C.

Syntheses of these polyketones are described in the patents of U.S. Pat. Nos. 4,843,144, 4,880,903 and 3,694,412. Preference is given in particular to aliphatic polyketones obtained by reaction of gaseous ethylene and/or propylene with carbon monoxide via catalysis with palladium(II).

The composition (C) according to the invention generally comprises no more than 5% by weight of polyketone (K), preferably between 1% and 4% by weight, based on the total weight of the composition (C).

The Rubber (R)

Typically, the composition (C) according to the invention contains 5% to 35% by weight of a rubber (R), preferably 10% to 30% by weight, and more preferably 15% to 25% by weight, based on the total weight of the composition (C).

As used herein, the term "rubber" is to designate elastomeric materials or rubbery materials including natural rubbers and synthetic rubbers which are capable of being cured or vulcanized, as by the aid of heat and suitable vulcanizing agents.

The rubber (R) may be selected from homopolymers and copolymers of conjugated dienes. Preferably, the rubber (R) is selected from copolymers built up from at least two of the following monomers as main components: ethylene, propylene, butadiene, isobutene, isoprene, chloroprene, vinyl acetate, styrene, acrylonitrile and acrylic and methacrylic esters of from 1 to 18 carbon atoms in the alcohol component.

For the selection of rubber (R), those containing reactive components which produce adhesion to the amine or carboxyl end groups on the polyamide are preferred. Suitable reactive components are olefinically unsaturated carboxylic acids and anhydrides thereof.

Some of the preferred types of rubber (R) are described as below.

A first preferred group of rubber (R) are ethylene copolymer rubbers [rubber (ER)], notably including:

ethylene-propylene (EPM) and ethylene-propylene-diene (EPDM) rubbers which preferably have an ethylene/propylene ratio within the range from 40:60 to 90:10, such as those described in U.S. Pat. No. 5,030,689 (BASF AKTIENGESELLSCHAFT) Jul. 9, 1991; and copolymers of ethylene with acrylic acid and/or methacrylic acid and/or the esters of these acids, including ethylene acrylic acid (EAA) copolymers and ethylene methacrylic acid (EMAA) copolymers, preferably EAA copolymers.

EPM rubbers generally have virtually no double bonds any longer, while EPDM rubbers may have from 1 to 20 double bonds per 100 carbon atoms.

Suitable diene monomers for EPDM rubbers are for example conjugated dienes such as isoprene and butadiene, non-conjugated dienes of from 5 to 25 carbon atoms, such as penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene, and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo[5.2.1.0.2.6]-3,8-decadiene or mixtures thereof. Preference is given to 1,5-hexadiene, 5-ethylidenenorbornene and dicyclopentadiene. The diene content of EPDM rubbers is preferably from 0.5% to 50%, more preferably from 1% to 8% by weight, based on the total weight of the rubber.

Further, for copolymers of ethylene with the esters of acrylic and/or methacrylic acid, the preferred esters of acrylic and/or methacrylic acid are the methyl, the ethyl, the propyl and the i- or the t-butyl esters.

Additionally, the above-described rubber (ER) may be grafted with dicarboxylic acids (e.g., maleic acid and fumaric acid) or their derivatives (e.g. esters and anhydrides), and/or epoxy groups, to produce a class of grafted ethylene copolymer, hereinafter referred to as 'rubber (GER)'. In preparation of rubber (GER), the dicarboxylic acid derivatives and epoxy groups can be incorporated in the polymer chain by adding to the monomer mixture dicarboxyl- and epoxy-containing monomers of the general formulae I or II or III or IV

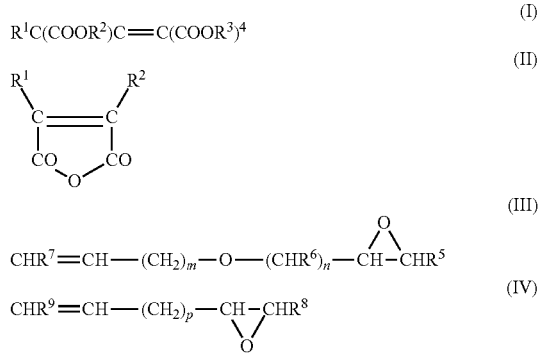

where $R^1$-$R^9$ are each hydrogen or alkyl of from 1 to 6 carbon atoms, m is an integer from 0 to 20, n is an integer from 0 to 10, and p is an integer from 0 to 5. Preferably, $R^1$-$R^9$ are each hydrogen, m is 0 or 1 and n is 1. The corresponding compounds are maleic acid, fumaric acid, maleic anhydride, alkyl glycidyl ethers and vinyl glycidyl ether.

Preferred compounds of the formulae I, II and III are maleic acid, maleic anhydride and epoxy-containing esters of acrylic acid and/or methacrylic acid, particular preference being given to glycidyl acrylate and glycidyl methacrylate.

The ethylene content of the rubber (GER) is in general within the range from 50% to 98% by weight, and the proportions of epoxy-containing monomers and of the acrylic and/or methacrylic ester are each within the range from 1% to 49% by weight.

For the selection of rubber (GER), particular preference is given to copolymers of:

from 50% to 98%, in particular from 60% to 95%, by weight of ethylene, from 0.5% to 40%, in particular from 3% to 20%, by weight of glycidyl acrylate and/or glycidyl methacrylate, acrylic and/or maleic anhydride, and from 1% to 45%, in particular from 10% to 35%, by weight of n-butyl acrylate and/or 2-ethylhexyl acrylate.

The above-described rubber (ER) can be prepared in any conventional manner, for example by random copolymerization under high pressure at elevated temperatures.

A second preferred group of rubbers (R) include graft copolymers with butadiene, butadiene/styrene, butadiene/acrylonitrile and acrylic esters, as described for example in DE 1694173 A and DE 2348377 A. Particular examples among them include ABS polymers, such as those described in EP 022216 A.

As a third preferred group, the rubber (R) may also be a graft polymer of
from 25% to 98% by weight of an acrylate rubber having a glass transition temperature of below −20° C. as a grafting base (base polymer) and
from 2 to 75% by weight of a copolymerizable ethylenically unsaturated monomer whose homopolymers or copolymers have a glass transition temperature of more than 25° C. as a graft surface (graft sheath), hereinafter referred to as 'rubber (GAR)'.

The grafting yields of rubber (GAR), i.e. the ratio of the amount of grafted-on monomer to the amount of graft monomer used, is in general within the range from 20% to 80%.

The grafting base of rubber (GAR) comprises acrylate or methacrylate rubbers in which up to 40% by weight of further comonomers may be present. The $C_1$-$C_8$-esters of acrylic acid and methacrylic acid and halogenated derivatives thereof and also aromatic acrylic esters and mixtures thereof are preferred. Suitable comonomers for the grafting base of rubber (GAR) are acrylonitrile, methacrylonitrile, styrene, α-methylstyrene, acrylamides, methacrylamides and vinyl $C_1$-$C_6$-alkyl ethers.

The grafting base of rubber (GAR) may be uncrosslinked, or partially or completely crosslinked. Crosslinking is obtained for example by copolymerization of preferably from 0.02% to 5% by weight, in particular from 0.05% to 2% by weight, of a crosslinking monomer having more than one double bond. Preferred crosslinking monomers include triallyl cyanurate, triallyl isocyanurate, triacryloylhexahydro-striazine and trialkylbenzenes.

If the crosslinking monomers in the grafting base of rubber (GAR) have more than 2 polymerizable bonds, it is advantageous to restrict the quantity thereof to no more than 1% by weight, based on the grafting base.

Particularly preferred grafting bases of rubber (GAR) are emulsion polymers having a gel content of more than 60% by weight (determined in dimethylformamide at 25° C.). Other useful grafting bases of rubber (GAR) are acrylate rubbers having a diene core, such as those described in EP 50262 A.

Suitable graft monomers of rubber (GAR) are in particular styrene, ε-methylstyrene, acrylonitrile, methacrylonitrile and methyl methacrylate or mixtures thereof, in particular those of styrene and acrylonitrile in a weight ratio of from 1:1 to 9:1.

Rubbers (R) preferably have a glass transition temperature of below −30° C., in particularly below −40° C.

It will be readily understood that it is also possible to use mixtures of the above-specified types of rubber (R), in the composition (C) of the invention.

Filler (F)

Optionally, the composition (C) of the invention can further comprise fillers (F) conventionally used in the manufacture of polyamide based compositions.

Said filler (F) can be any reinforcement or bulking agent, and is preferably selected from the group consisting of calcium carbonate, glass fibers, glass flakes, glass beads, carbon fibers, talc, mica, wollastonite, calcined clay, kaolin, diatomite, magnesium sulphate, magnesium silicate, barium sulphate, titanium dioxide, sodium aluminium carbonate, barium ferrite, potassium titanate.

The filler (F), from morphology perspective, may be selected from fibrous fillers and particulate fillers.

Preferably, the filler is chosen from fibrous fillers. Among fibrous fillers, glass fibers are preferred; they include chopped strand A-, E-, C-, D-, S- and R-glass fibers. Glass fibers with circular and non-circular cross sections can be used. As used herein, the expression of "glass fibers with non-circula cross section" is used to indicate glass fibers having a cross section having a major axis lying perpendicular to longitudinal direction of the glass fiber and corresponding to the longest linear distance in the cross-section, and a minor axis, corresponding to the linear distance in cross-section in a direction perpendicular to the major axis. The non-circular cross section of the fiber may have a variety of shapes including cocoon-type shape, a rectangular shape, an elliptical shape, a polygonal shape, an oblong shape, and the like. A ratio of the length of the major axis to the minor axis is preferably between about 1.5:1 to about 6:1, more preferably between about 2:1 to about 5:1, still more preferably between about 3:1 to about 4:1.

In preferred embodiments, glass fibers, and more particularly, circular cross-section glass fibers will be used as filler (F).

The composition (C) may comprise at least 15% wt, preferably at least 20% wt of filler (F), with respect to the total weight of the composition (C).

Further, the composition (C) usually comprises at most 60% wt, preferably at most 55% wt, and more preferably at most 50% wt of filler (F), with respect to the total weight of the composition (C).

Particularly good results have been obtained when the composition (C) comprised from about 10 to about 40% wt of filler (F), with respect to the total weight of the composition (C).

Optional Co-Stabilizers (S)

The composition (C) may also comprise one or more than one heat stabilizer or anti-oxidant, hereby referred to as 'co-stabilizer (S).

Co-stabilizers (S), when used in the composition (C) are generally selected from the group consisting of hindered amine compounds, hindered phenol compounds, phosphorous compounds and copper-containing stabilizers.

The expression "hindered amine compound" is used according to its customary meaning in this field and generally intended to denote derivatives of 2,2,6,6-tetramethyl piperidine well known in the art. The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600 and most preferably of at most 500 g/mol.

Examples of low molecular weight hindered amine compounds are listed in Table A below:

TABLE A

| Formula |
| --- |
| (a1) 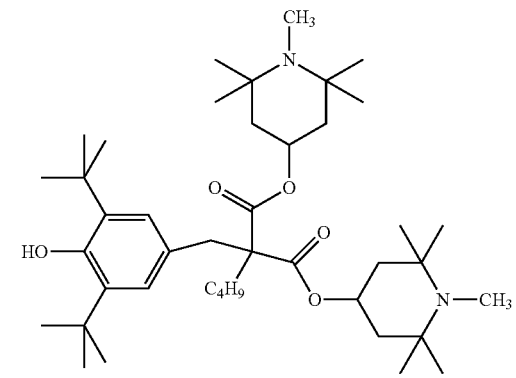 |
| (a2) 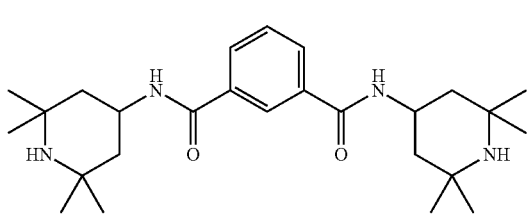 |

TABLE A-continued
Formula
(a3) 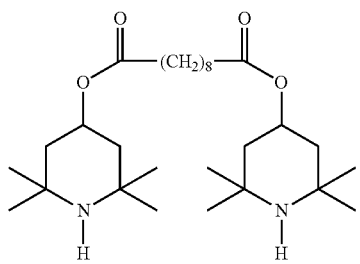
(a4) 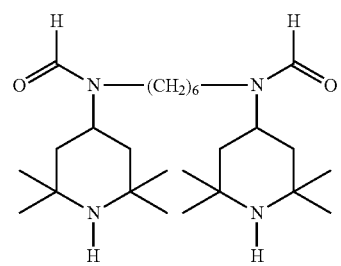
(a5) 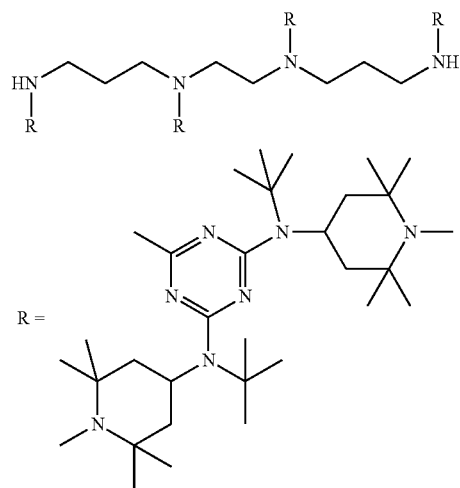
(a6) 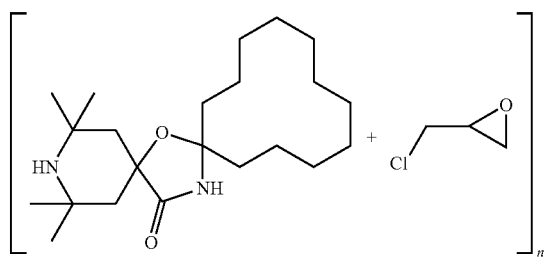
(a7) 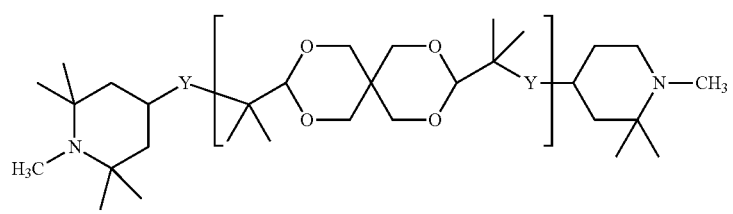

TABLE A-continued
Formula
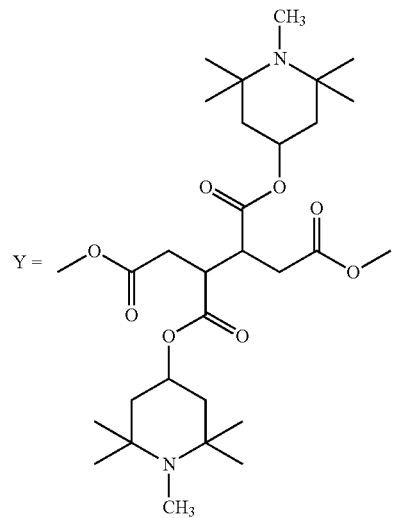
(a8)
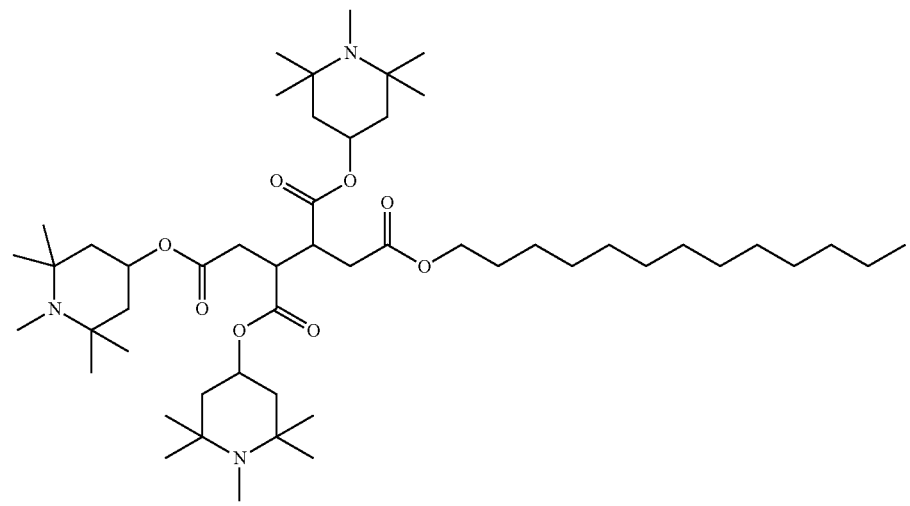 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1]
(a9)
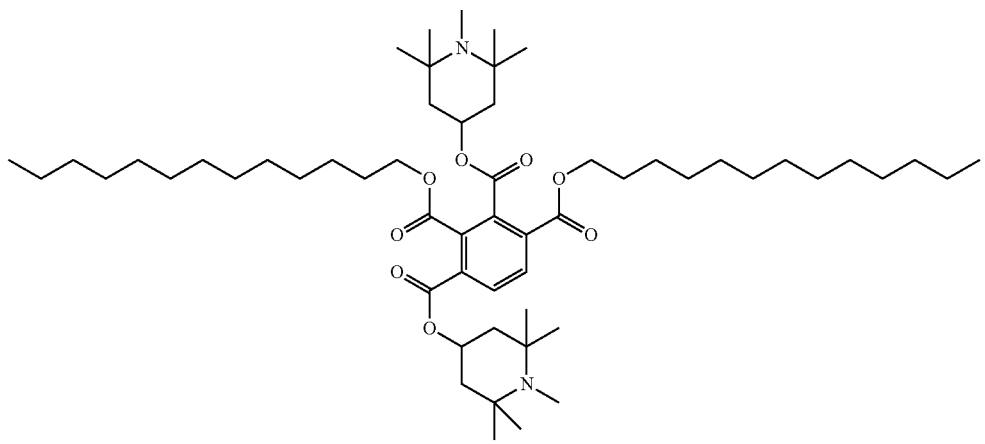 [SMILES: CCCCCCCCCCCCCOC(=O)c1ccc(C(=O)OC2CC(C)(C)N(C)C(C)(C)C2)c(C(=O)OCCCCCCCCCCCCC)c1C(=O)OC1CC(C)(C)N(C)C(C)(C)C1]

TABLE A-continued

| Formula | |
|---|---|
| (a10) | 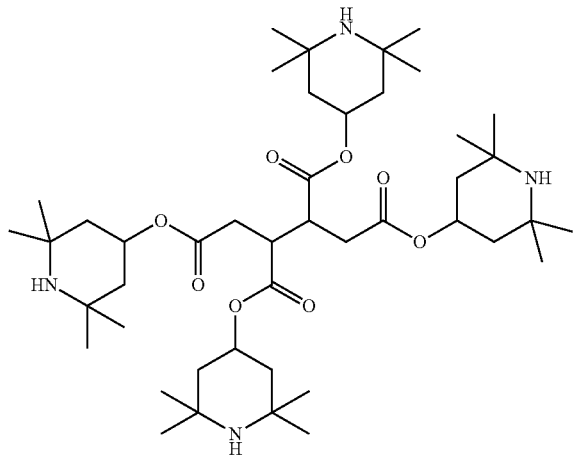 |
| (a11) | 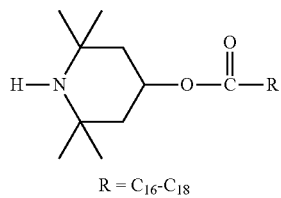 |
| (a12) | 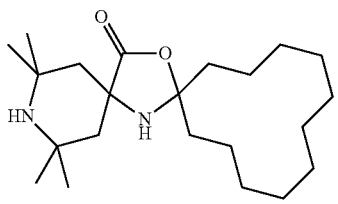 [SMILES: CC1(C)CC2(CC(C)(C)N1)NC1(CCCCCCCCCCC1)OC2=O] |

Among those low molecular weight compounds, the hindered amine is preferably selected from the group consisting of the ones corresponding to formula (a1), (a2), (a11) and (a12). More preferably, the hindered amine is selected from the group consisting of the ones corresponding to formula (a1), (a2), and (a12). Still more preferably, the hindered amine is the one corresponding to formula (a2).

The hindered amine compounds of high molecular weight are typically polymeric and have typically a molecular weight of at least 1000, preferably at least 1100, more preferably of at least 1200, still more preferably at least 1300 and most preferably of at least 1400 g/mol.

Examples of high molecular weight hindered amine compounds are listed in Table B below:

TABLE B

| Formula | |
|---|---|
| (b1) | 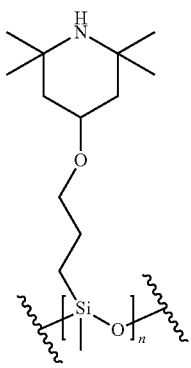 |

TABLE B-continued
Formula
(b2) 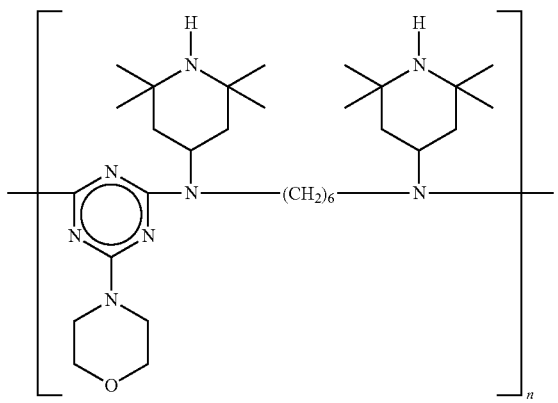
(b3) 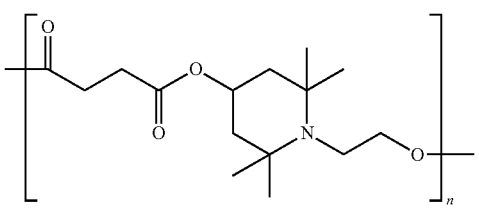
(b4) 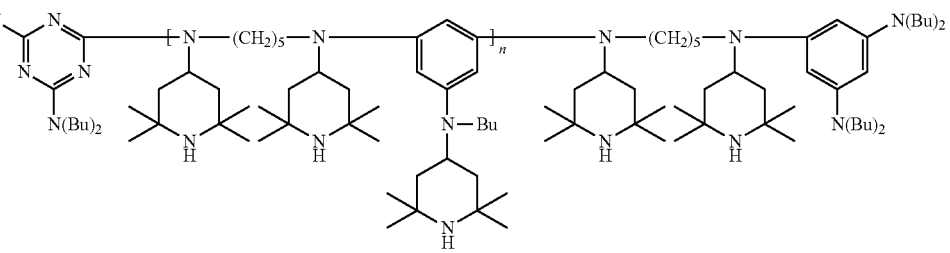
(b5) 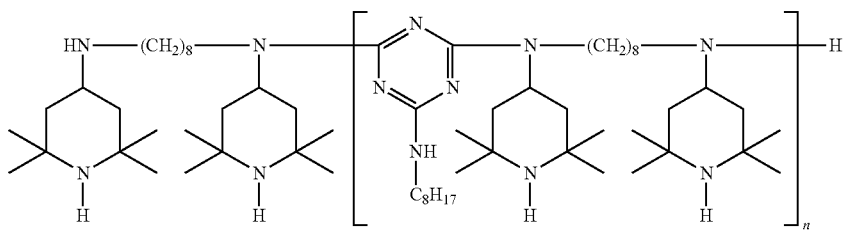
(b6) 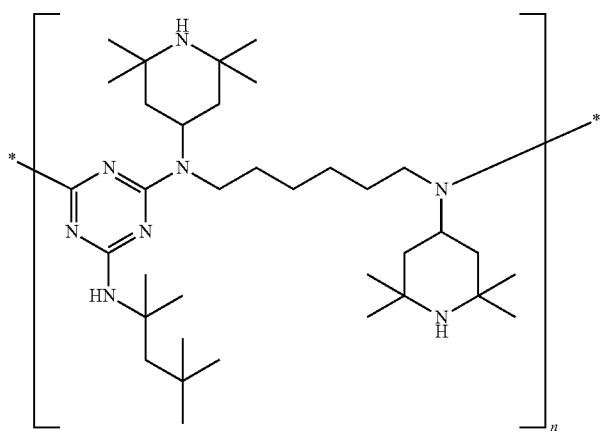

The "n" in the formulas (b1) to (b6) of Table B indicates the number of repeating units in the polymer and is usually an integral equal or greater than 4.

Among those high molecular weight compounds, the hindered amine is preferably selected from the group consisting of the ones corresponding to formula (b2) and (b5). More preferably, the high molecular weight hindered amine is the one corresponding to formula (b2).

If used, the hindered amine compound is typically present in an amount of advantageously at least 0.01 wt. %, more preferably at least 0.05 wt. %, still more preferably at least 0.1 wt. %, based on the total weight of the composition.

Similarly, when present, the hindered amine compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The expression "hindered phenol compound" is used according to its customary meaning in this field and generally intended to denote derivatives of ortho-substituted phenol, especially (but not limited to) di-tert-butyl-phenol derivatives, well known in the art.

Examples of hindered phenol compounds are listed in Table C below:

TABLE C (d1) tetrakis(3-(3,5-di-tert-butyl-4-hydroxyphenyl)propionate), commercially available notably as Irganox ® 1010 stabilizer from BASF

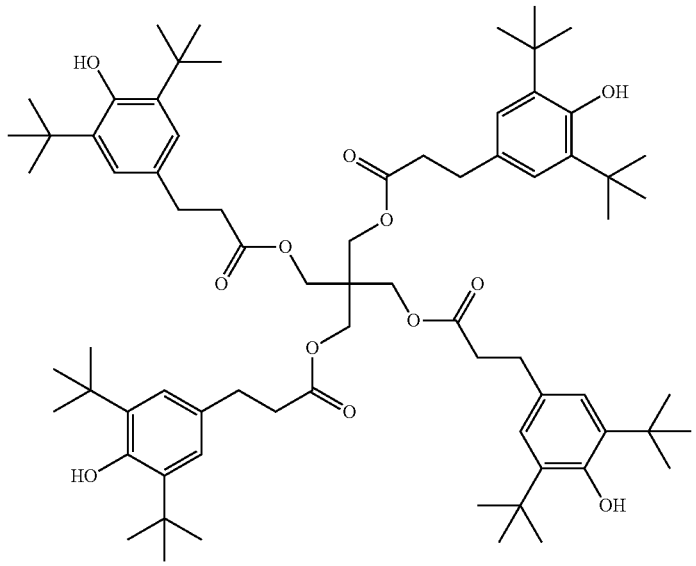 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

(d2) Thiodiethylenebis[3-(3,5-di-tert.-butyl-4-hydroxy-phenyl)propionate], commercially available notably as Irganox ® 1035 stabilizer from BASF

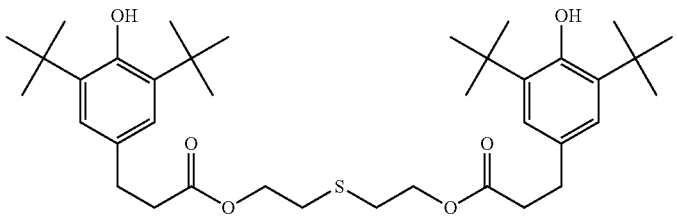 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

(d3) Octadecyl-3-(3,5-di-tert.butyl-4-hydroxyphenyl)-propionate, commercially available notably as Irganox ® 1076 stabilizer from BASF

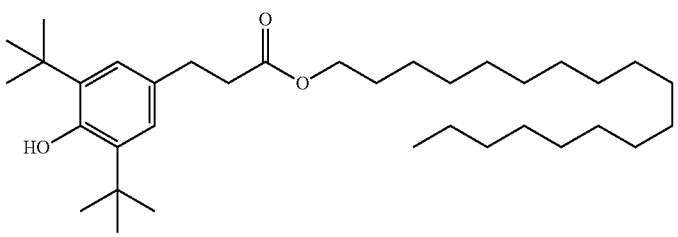 [SMILES: CCCCCCCCCCCCCCCCCCOC(=O)CCc1cc(C(C)(C)C)c(O)c(C(C)(C)C)c1]

(d4) N,N'-hexane-1,6-diylbis(3-(3,5-di-tert.-butyl-4-hydroxyphenylpropionamide)), commercially available notably as Irganox ® 1098 stabilizer from BASF

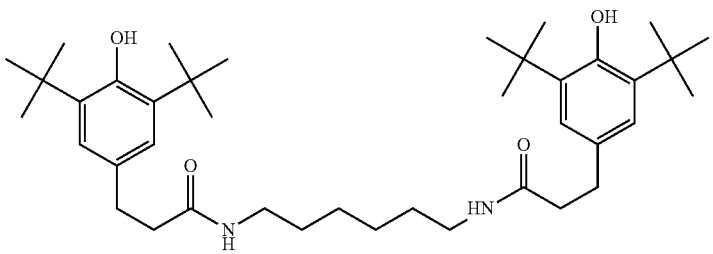 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued (d5) 1,3,5-Trimethyl-2,4,6-tris(3,5-di-tert-butyl-4-hydroxybenzyl)benzene, commercially available notably as Irganox ® 1330 stabilizer from BASF

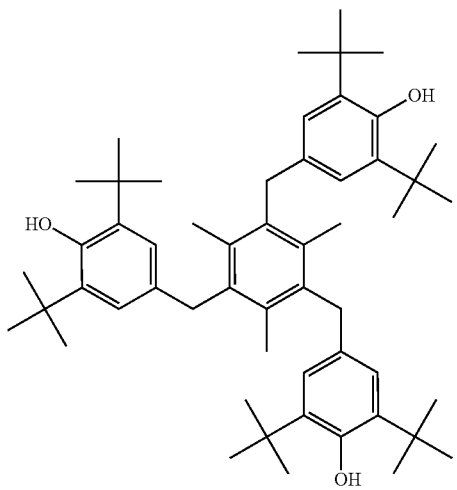 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

(d6) Benzenepropanoic acid, 3,5-bis(1,1-dimethylethyl)-4-hydroxy-,C7-C9 branched alkyl esters, commercially available notably as Irganox ® 1135 stabilizer from BASF

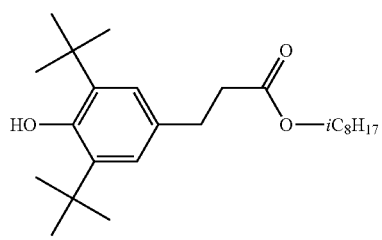

(d7) Hexamethylene bis[3-(3,5-di-tert-butyl-4-hydroxyphenyl)propionate], commercially available notably as Irganox ® 259 stabilizer from BASF

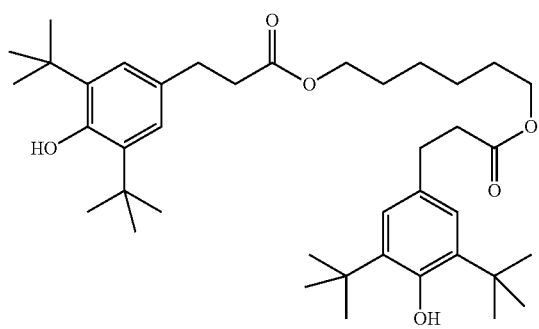 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

(d8) Tris(3,5-di-tert-butyl-4-hydroxybenzyl) isocyanurate, commercially available notably as Irganox ® 3114 stabilizer from BASF

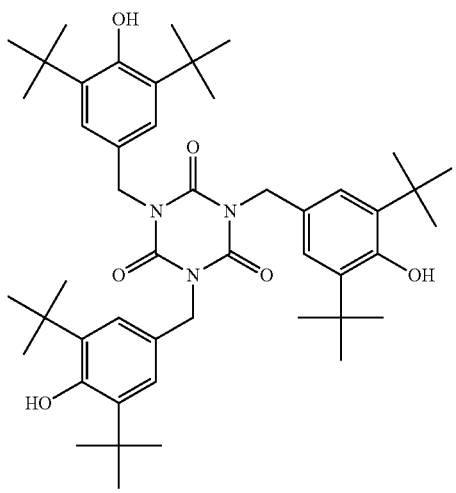 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued (d9) 2,6-di-tert-butyl-4-(4,6-bis(octylthio)-1,3,5-triazin-2-ylamino)phenol, commercially available notably as Irganox® 565 stabilizer from BASF

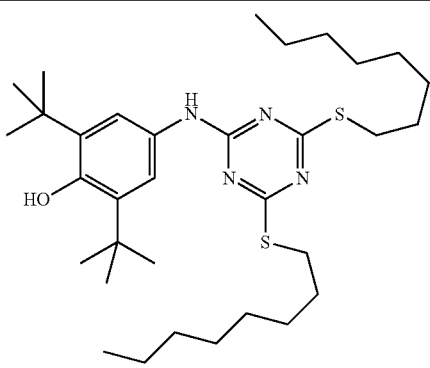

(d10) commercially available notably as Irganox® 1425 stabilizer from BASF

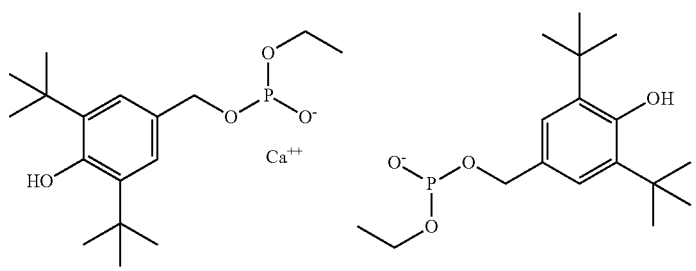 [SMILES: CCOP([O-])OCc1cc(C(C)(C)C)c(O)c(C(C)(C)C)c1 ; [Ca+2] ; CCOP([O-])OCc1cc(C(C)(C)C)c(O)c(C(C)(C)C)c1]

(d11) 2-Methyl-4,6-bis(octylsulfanylmethyl)phenol, commercially available notably as Irganox® 1520 stabilizer from BASF

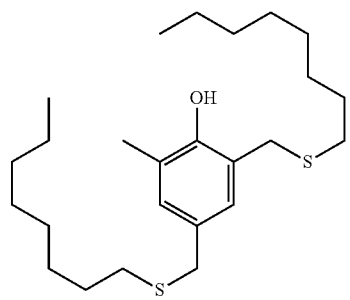 [SMILES: CCCCCCCCSCc1cc(C)c(O)c(CSCCCCCCCC)c1]

(d12) 2,4-Bis(dodecylthiomethyl)-6-methylphenol, commercially available notably as Irganox® 1726 stabilizer from BASF

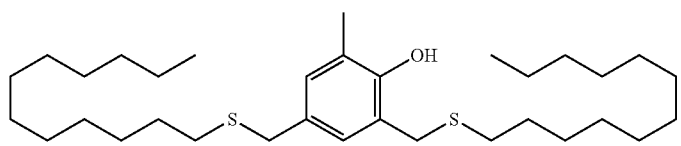 [SMILES: CCCCCCCCCCCCSCc1cc(C)c(O)c(CSCCCCCCCCCCCC)c1]

(d13) Triethylene glycol bis(3-tert-butyl-4-hydroxy-5-methylphenyl)propionate, commercially available notably as Irganox® 245 stabilizer from BASF

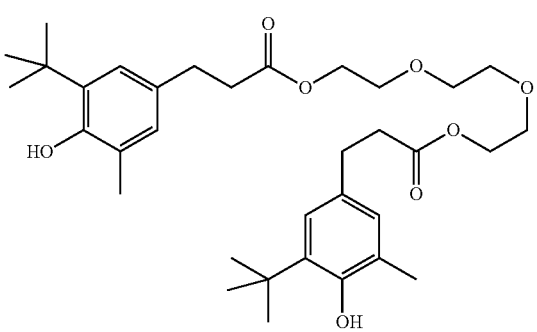 [SMILES: Cc1cc(CCC(=O)OCCOCCOCCOC(=O)CCc2cc(C)c(O)c(C(C)(C)C)c2)cc(C(C)(C)C)c1O]

A hindered phenol compound which has been found particularly effective in the composition (C) is N,N'-hexane-1,6-diylbis (3-(3,5-di-tert.-butyl-4-hydroxyphenylpropionamide)) of formula (d4), as above specified.

If used, the hindered phenol compound is typically present in an amount of advantageously at least 0.01 wt. %, more preferably at least 0.05 wt. %, still more preferably at least 0.1 wt. %, based on the total weight of the composition.

Similarly, when present, the hindered phenol compound is also typically present in an amount of advantageously at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %, based on the total weight of the composition.

The co-stabilizers (S) may be at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table D below:

TABLE D

| Formula |
|---|
| (e1) |
| (e2) |
| (e3) |
| (e4) |
| (e5) |

TABLE D-continued
Formula
(e6) 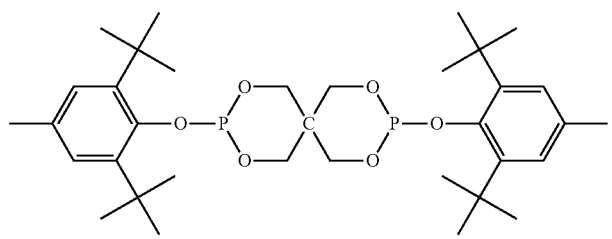
(e7) 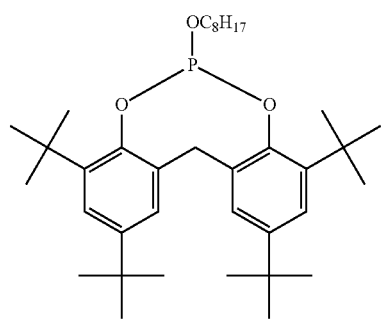
(e8) 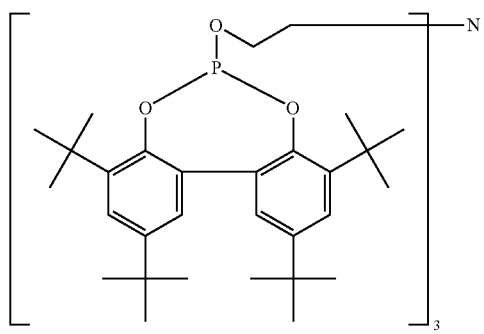
(e9) 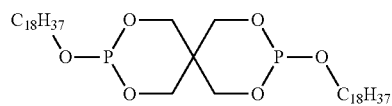
(e10) 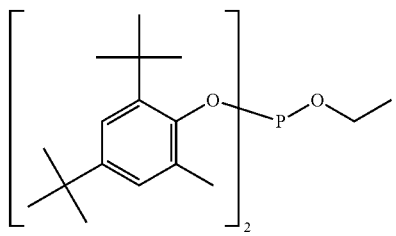
(e11) 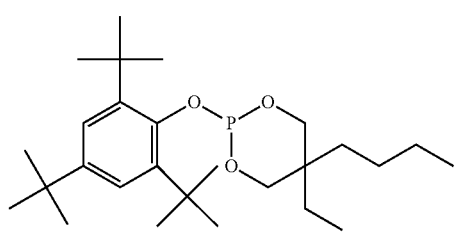 [SMILES: CCCCC1(CC)COP(Oc2c(C(C)(C)C)cc(C(C)(C)C)cc2C(C)(C)C)OC1]

TABLE D-continued

Formula (e12)
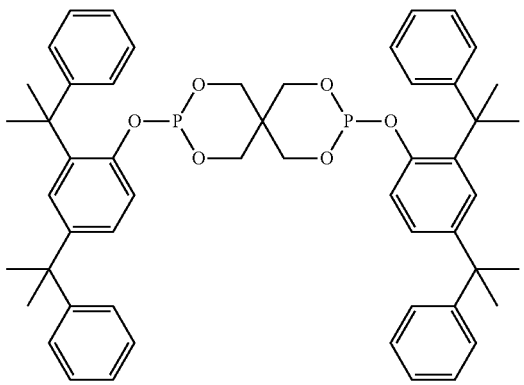 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

Examples of phosphonites are listed in the table E below:

TABLE E

| Formula | Structure |
| --- | --- |
| (f1) | 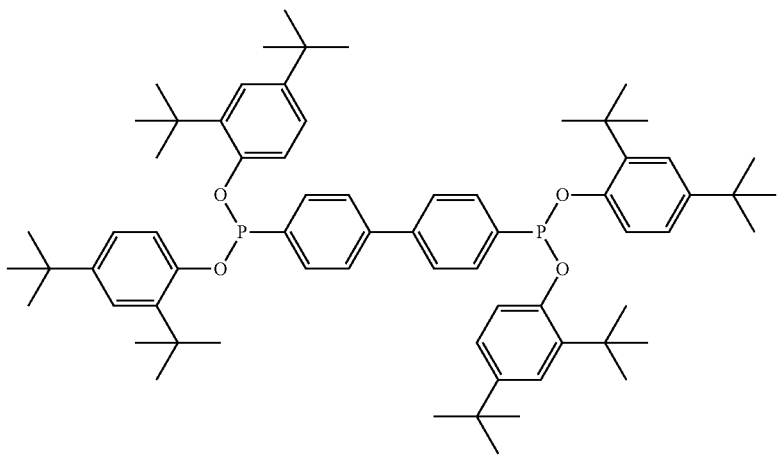 [SMILES: CC(C)(C)c1ccc(OP(Oc2ccc(C(C)(C)C)cc2C(C)(C)C)c2ccc(-c3ccc(P(Oc4ccc(C(C)(C)C)cc4C(C)(C)C)Oc4ccc(C(C)(C)C)cc4C(C)(C)C)cc3)cc2)c(C(C)(C)C)c1] |
| (f2) | 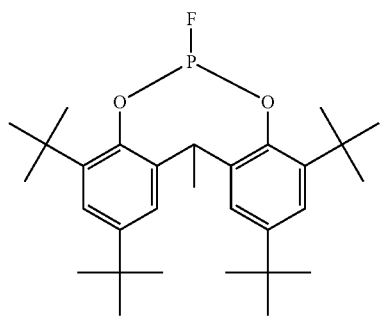 [SMILES: CC1c2cc(C(C)(C)C)cc(C(C)(C)C)c2OP(F)Oc2c1cc(C(C)(C)C)cc2C(C)(C)C] |

When used in the composition (C), the phosphorous compound is preferably present in an amount of at least 0.01 wt. %, more preferably at least 0.05 wt. %, based on the total weight of the composition.

The phosphorous compound is also preferably present in an amount of at most 1 wt. %, more preferably at most 0.5 wt. %, still more preferably at most 0.25 wt. %, based on the total weight of the composition.

Copper-containing stabilizers useful as co-stabilizers (S) in the practice of the invention may be characterized as comprising a copper compound and an alkali metal halide. More particularly, the copper-containing stabilizer will consist essentially of a copper compound [compound (Cu)] selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide [halide (M)]. Preferably, the copper-containing stabilizer will consist essentially of a copper halide selected from copper iodide and copper bromide and the alkali metal halide will preferably be selected from the iodides and bromides of lithium, sodium and potassium.

A particularly preferred combination is the combination of CuI and KI.

The copper-containing stabilizer will preferably comprise a copper (I) compound [compound (Cu)] and an alkali metal halide [halide (M)] at a weight ratio compound (Cu):halide (M) of 1:99 to 30:70, preferably 5:95 to 20:80, more preferably 10:90 to 15:85. A weight ratio compound (Cu): halide (M) which has been found particularly effective is of about 0.15 (i.e. corresponding to about 13:87).

The combined weight of compound (Cu) and halide (M) in the composition (C), when present, will amount to from about 0.01 to about 2.5 wt %, preferably from about 0.1 to about 1.5 wt %, based on the total weight of composition (C).

The amount of the compound (Cu) in the copper-containing stabilizer, when used, will generally be sufficient to provide a level of from about 25 to about 1000 ppm, preferably of about 50 to about 500 ppm, more preferably of about 75 to about 150 ppm of Copper in the composition (C).

Optional Plasticizer

Optionally, the composition (C) also contains a plasticizer as processing aid. Suitable plasticizer can be chosen from benzenesulphonamide derivatives, such as N-butylbenzenesulphonamide (BBSA), ethyltoluenesulphonamide or N-cyclohexyltoluenesulphonamide; esters of hydroxybenzoic acids, such as 2-ethylhexyl-para-hydroxybenzoate and 2-decylhexyl-para-hydroxybenzoate; esters or ethers of tetrahydrofurfuryl alcohol, like oligoethoxylated tetrahydrofurfuryl alcohol; and esters of citric acid or hydroxymalonic acid, such as oligoethoxylated malonate. Mention may also be made of decylhexyl-para-hydroxybenzoate and ethylhexyl-para-hydroxybenzoate. Among the above group, N-butyl-benzenesulphonamide (BBSA) is considered an effective plasticizer and is widely used.

A significant advantage of the composition (C) of the invention is that good processability (esp. extrudability) is provided without using any of the above mentioned plasticizers, or with a much lower level than the generally recommended amount. This is significant because many plasticizers as aforementioned, such as BBSA, are known to be toxic and environmental unfriendly.

Thus, in one preferred embodiment, the composition (C) contains a plasticizer in a mere amount of lower than 5% by weight, preferably lower than 1% by weight, with respect to the total weight of the composition (C).

Other Optional Additives

The composition (C) may also comprise other conventional additives commonly used in the art, including lubricants, colorants, pigments, antistatic agents, flame-retardant agents, nucleating agents, catalysts, and the like.

Manufacture of the Composition (C)

The invention further pertains to a method of making the composition (C) as above detailed, said method comprising melt-blending the polyamide (A), the polyketone (K) and the rubber (R), in the presence of any other optional ingredients.

The composition (C) of the invention are generally obtained by blending the various constituents under hot conditions, for example in a single- or twin-screw extruder, at a temperature sufficient to keep the polyamide resin as a molten medium, or under cold conditions, in a mechanical mixer in particular. Generally, the blend obtained is extruded in the form of rods, which are cut up into pieces to form granules. Non-polymeric compounds/additives of composition (C) can be added at any point in the manufacture process of composition (C), in particular by hot or cold blending with the polymer matrix. Specifically, these non-polymer compounds/additives can be added to the molten polymer matrix in the pure form or in the form of a concentrated mixture in a matrix, such as a plastic matrix.

The composition (C) is preferably a composition to be molded, for example in the form of granules or powder, used in any process for forming plastics, such as injection molding, rotational molding, sintering or casting, extrusion processes such as extrusion/blow molding and film-forming, and spinning processes. Advantageously, the composition (C) can be used to mold articles via an extrusion molding process, although injection molding is also possible.

The invention thus also relates to processes for the manufacture of molded or extruded articles by forming a composition (C) of the invention, and articles produced by injection or extrusion molding the composition (C).

Use of the Composition (C)

In one aspect, the present invention relates to a use of the composition (C) for automotive and electrical/electronics applications.

In yet another aspect, the present invention relates to a method for manufacturing an article by shaping the composition (C) of the invention. Examples of articles are films or tubing, automotive parts or engine parts or electrical/electronics parts. By "shaping", it is meant any shaping technique, such as for example extrusion, injection moulding, thermoform moulding, compression moulding or blow moulding. Preferably, the article is shaped by extrusion.

The extruded or molded articles shaped by the composition (C) are particularly advantageous for application in many vehicular components that meet one or more of the following requirements: high impact requirements; resistance to high temperature; and resistance to chemical agents such as coolants and salt. Specific extruded or molded articles are selected from the group consisting of fuel lines, flexible hoses & tubes, corrugated tubes, coolant & degassing pipes, air braking systems, charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers.

DESCRIPTION OF EMBODIMENTS

The present invention is further illustrated by the following examples. It should be understood that the following examples are for illustration purposes only, not to limit the scope of the present invention.

EXAMPLES

Materials
(1) Polyamides:
PA 6: manufactured by Hyosung Corp, 1031 BRT (relative viscosity*=3.1)
PA 610: manufactured by Nexis-Fibers AG (relative viscosity=3.7)
PA 1010: a high-viscosity polyamide provided by Shandong Dongchen Engineering Plastic Co., Ltd.

* Consistent with the foregoing description, the relative viscosity is the ratio of solution and solvent viscosities measured in a capillary viscometer at 25° C., wherein the solvent is 96% sulfuric acid, and the solution is 1.0% by weight polyamide polymer dissolved in said solvent.

(2) Polyketone: an aliphatic polyketone manufactured by Hyosung Corp, which is a copolymer of ethylene, propylene and carbon oxide and named as M630A (3) Rubber: Escor™ 5050, an EAA rubber manufactured by Exxon Mobile Chemical Corp.

(4) Antioxidant: Irganox® 1098 at 0.2% concentration (5) Heat stabilizer: CuI/KI type Master batch at 0.3% concentration (6) Lubricant: EAA oligomer ACP-540 at 0.5% concentration (7) Coolant A: a Texaco commercial formulation identified as Dex-Cool®;
  Coolant B: GS Caltex coolant manufactured by GS Caltex Corporation
  Measurement of Chemical Resistance Properties
  $ZnCl_2$ Salt Resistance Test Specimens used in this test were injection molded test bars cut from the injection molded article, and each has a dimension of 80×10×2 mm. The test bars were bent into U shape and positioned into a holder with an insider width of 18 mm. The holder was placed in large vessels, which were pre-filled with a 50 wt % $ZnCl_2$ solution that filly immersed the test bars. The vessels were then placed in an air-circulated oven for 72 hours, where a temperature of 90° C. was maintained. Subsequently, the test bars in the specimen holders were pulled out from the vessels and placed in the same air-circulated oven at 90° C. for another 24 hours, after which the cracking of the test bars were examined.

Glycol Resistance Test

Tensile strength was measured according to ISO 527-2, using type 1A specimens which were immersed and aged in 50 vol % of an aqueous coolant solution at 130° C. for 504 hours (using coolant A), or at 146° C. for 144 hours (using coolant B).

Examples 1-3

Blend samples of at least one polyamide polymer, a polyketone and a rubber component are prepared using a Coperion twin screw extruder, which varied in the amount or polymer components as indicated in Table 1 and each incorporating 1 wt % of other additives including the same antioxidant, heat stabilizer, and lubricant as above detailed. These samples were then injection molded using two cavity ISO mold. The thus molded articles were each tested (dry as molded) for mechanical and chemical properties, as shown in Table 2.

Comparative Examples 1-4

In these comparative examples, various polyamide/polyketone blends were made in the same manner as Examples 1-3, only without rubber component. These blends were also injection molded using two cavity ISO mold. The thus molded articles therefrom were each tested (dry as molded) for mechanical and chemical properties, indicated as CE 1-4 in Table 2.

TABLE 1

|       | Polyketone (wt %) | rubber (wt %) | PA 6 (wt %) | PA 610 (wt %) | PA1010 (wt %) |
|-------|-------------------|---------------|-------------|---------------|---------------|
| Ex. 1 | 2                 | 15            | 82          | —             | —             |
| CE. 1 | 2                 | —             | 97          | —             | —             |
| Ex. 2 | 2                 | 15            | —           | 82            | —             |
| CE. 2 | 2                 | —             | —           | 97            | —             |
| Ex. 3 | 2                 | 15            | —           | 55            | 27            |

TABLE 1-continued

|       | Polyketone (wt %) | rubber (wt %) | PA 6 (wt %) | PA 610 (wt %) | PA1010 (wt %) |
|-------|-------------------|---------------|-------------|---------------|---------------|
| CE. 3 | 2                 | —             | —           | 65            | 32            |
| CE. 4 | —                 | —             | —           | 66            | 33            |

TABLE 2

|       | $EI^0$ % | $I.I^1$ $kJ/m^2$ | $C.I.^2$ $kJ/m^2$ | Glycol resistance $(A)^3$ | Glycol resistance $(B)^4$ | $ZnCl_2$ salt resistance |
|-------|----------|------------------|-------------------|---------------------------|---------------------------|--------------------------|
| Ex. 1 | 86.5     | 15.0             | 16.1              | 51.8%                     | 44.4%                     | Minor crack              |
| CE. 1 | 65.4     | 4.8              | 2.8               | 45.6%                     | break                     | Deep crack               |
| Ex. 2 | 97.1     | 10.4             | 10.3              | 77.6%                     | 78.9%                     | No crack                 |
| CE. 2 | 43.7     | 4.9              | 4.5               | 75.3%                     | 77.2%                     | Minor crack              |
| Ex. 3 | 137.2    | 7.4              | 7.8               | 72.9%                     | 77.1%                     | No crack                 |
| CE. 3 | 135.9    | 4.9              | 3.5               | 56.8%                     | 74.7%                     | No crack                 |
| CE. 4 | 101.9    | 4.3              | 3.1               | 52.3%                     | 65.5%                     | Minor crack              |

$^0$EI = Elongation
$^1$I.I = Izod Impact
$^2$C.I = Charpy Impact
$^3$Glycol resistance (A): tested using the 50 vol % aqueous solution of coolant A, at 130° C. for 504 hours
$^4$Glycol resistance (B): tested using the 50 vol % aqueous solution of coolant B, at 146° C. for 144 hours The above experimental data reveal that the polyamide compositions according to the invention have an appreciably improved balance of mechanical properties, combined with excellent chemical resistance both to glycol and salt cracking. Thus, the compositions of the invention should be widely applied in various industrial fields, particularly to automotive parts which are exposed to salt and/or anti-freezing agents.

The invention claimed is:

1. A polyamide composition, consisting of:
   at least one polyamide;
   at least one polyketone, in an amount of 1 to 4 wt %, based on the total weight of the composition;
   at least one rubber in an amount of 10 to 35 wt %, based on the total weight of the composition; and
   optionally, one or more further components selected from the group consisting of fibrous fillers, particulate fillers, heat stabilizers, anti-oxidants, plasticizers, lubricants, colorants, pigments, antistatic agents, flame-retardant agents, nucleating agents, and catalysts.

2. The polyamide composition of claim 1, comprising a blend of at least two polyamides.

3. The polyamide composition of claim 1, wherein the at least one polyamide is selected from the group consisting of poly(ε-caprolactam) (PA 6), poly(tetramethylene adipamide) (PA 46), poly(hexamethylene adipamide) (PA 66), poly(hexamethylene decanediamide) (PA 610), poly(decamethylene decanediamide) (PA1010), poly(decamethylene dodecanediamide) (PA1012), and poly(dodecamethylene dodecanediamide) (PA1212).

4. The polyamide composition of claim 1, wherein the at least one polyamide comprises the condensation product of at least one aminocarboxylic acid selected from the group consisting of 6-aminohexanoic acid, 9-aminononanoic acid, 10-aminodecanoic acid, 11-aminoundecanoic acid, and 12-aminododecanoic acid.

5. The polyamide composition of claim 1, wherein the at least one polyketone is aliphatic.

6. The polyamide composition of claim 1, wherein the at least one polyketone comprises repeating units of formula:

in which A denotes a group derived from an ethylenically unsaturated hydrocarbon monomer having at least 3 carbon atoms, and the x/y ratio is at least 2.

7. The polyamide composition of claim 1, wherein the at least one rubber comprises ethylene copolymer rubber.

8. The polyamide composition of claim 7, wherein the at least one rubber comprises an ethylene acrylic acid copolymer.

9. The polyamide composition of claim 1, wherein the composition further comprises a plasticizer in an amount of lower than 5 wt %, based on the total weight of the composition.

10. The composition of claim 9, wherein the amount of plasticizer is-lower than 1 wt %, based on the total weight of the composition.

11. An article made by extrusion molding or injection molding the composition according to claim 1.

12. A method for manufacturing an article, comprising shaping the composition according to claim 1.

13. A method according to claim 12, wherein the shaping is by extrusion.

14. The method according to claim 12, wherein the article is selected from films, tubing, automotive parts, engine parts, electrical parts, and electronics parts.

15. The method of claim 12, wherein the shaping is by a technique selected from the group consisting of extrusion, injection moulding, thermoform moulding, compression moulding, and blow moulding.

* * * * *